(12) United States Patent
Taratine et al.

(10) Patent No.: US 11,727,396 B2
(45) Date of Patent: *Aug. 15, 2023

(54) PROCESSING ELECTRONIC TOKENS

(71) Applicant: Visa Europe Limited, London (GB)

(72) Inventors: Boris Taratine, London (GB);
Malcolm Lewis, London (GB)

(73) Assignee: Visa Europe Limited, London (GB)

( * ) Notice: Subject to any disclaimer, the term of this patent is extended or adjusted under 35 U.S.C. 154(b) by 611 days.

This patent is subject to a terminal disclaimer.

(21) Appl. No.: 16/920,207

(22) Filed: Jul. 2, 2020

(65) Prior Publication Data

US 2020/0334673 A1    Oct. 22, 2020

Related U.S. Application Data

(63) Continuation of application No. 15/004,753, filed on Jan. 22, 2016, now Pat. No. 10,762,499, which is a
(Continued)

(30) Foreign Application Priority Data

Jul. 25, 2013   (GB) ..................... 1313310

(51) Int. Cl.
*G06Q 20/38*      (2012.01)
*H04W 4/029*     (2018.01)
(Continued)

(52) U.S. Cl.
CPC ....... *G06Q 20/3821* (2013.01); *G06Q 20/325* (2013.01); *G06Q 20/3224* (2013.01); *G06Q 20/40* (2013.01); *H04W 4/029* (2018.02)

(58) Field of Classification Search
CPC ........... G06Q 20/3821; G06Q 20/3224; G06Q 20/325; G06Q 20/40; H04W 4/029
(Continued)

(56) References Cited

U.S. PATENT DOCUMENTS 7,707,405 B1    4/2010   Gilman et al.
10,762,499 B2   9/2020   Taratine et al.
(Continued)

FOREIGN PATENT DOCUMENTS

CN        102257524     11/2011
GB          2492614      1/2013
(Continued)

OTHER PUBLICATIONS

U.S. Appl. No. 15/004,753 , "Final Office Action", dated Sep. 18, 2018, 17 pages.
(Continued)

*Primary Examiner* — Steven S Kim
*Assistant Examiner* — Zesheng Xiao
(74) *Attorney, Agent, or Firm* — Kilpatrick Townsend & Stockton LLP

(57) ABSTRACT

Measures, including methods, apparatus and computer software are provided for processing electronic tokens. An authorization request is received in relation to processing of an electronic token. An identifier for a user terminal associated with the electronic token, and an account, are determined on the basis of the authorization request. In some arrangements, a location query for the user terminal is performed on the basis of the determined identifier, whereby to determine a location of the user terminal on the basis of a proximity of the user terminal to one or more base stations in a cellular telecommunications network. In some arrangements, a challenge message is sent to the user terminal, to establish a confidence that the transacting user terminal is the designated user terminal. Processing of the electronic token in relation to the account is selectively authorized on the basis of the result of the location query or challenge response.

20 Claims, 4 Drawing Sheets

Related U.S. Application Data continuation of application No. PCT/GB2014/052298, filed on Jul. 25, 2014.

(51) Int. Cl.
    *G06Q 20/40* (2012.01)
    *G06Q 20/32* (2012.01)

(58) Field of Classification Search
    USPC .......................................................... 705/76
    See application file for complete search history.

(56) References Cited

U.S. PATENT DOCUMENTS

| | | |
|---|---|---|
| 2006/0131390 A1 | 6/2006 | Kim |
| 2009/0065571 A1 | 3/2009 | Jain |
| 2009/0106152 A1 | 4/2009 | Dill et al. |
| 2009/0108063 A1 | 4/2009 | Jain et al. |
| 2010/0063935 A1 | 3/2010 | Thomas et al. |
| 2010/0088188 A1 | 4/2010 | Kumar et al. |
| 2011/0023096 A1 | 1/2011 | Xiao et al. |
| 2011/0202466 A1 | 8/2011 | Carter |
| 2012/0054841 A1 | 3/2012 | Schultz et al. |
| 2013/0065667 A1 | 3/2013 | Nelson et al. |
| 2017/0255932 A1 | 9/2017 | Aabye et al. |
| 2018/0053189 A1 | 2/2018 | Monk et al. |
| 2020/0334673 A1 | 10/2020 | Taratine et al. |

FOREIGN PATENT DOCUMENTS

| | | |
|---|---|---|
| KR | 20030043886 | 6/2003 |
| KR | 20110124462 A | 11/2011 |
| KR | 20120076590 | 7/2012 |
| KR | 20120082644 A | 7/2012 |
| KR | 20140015019 A | 2/2014 |
| WO | 2010043722 | 4/2010 |
| WO | 2013147904 | 10/2013 |
| WO | 2015011502 | 1/2015 |

OTHER PUBLICATIONS

U.S. Appl. No. 15/004,753 , "Non-Final Office Action", dated Nov. 22, 2019, 18 pages.

U.S. Appl. No. 15/004,753 , "Non-Final Office Action", dated Mar. 8, 2018, 16 pages.

U.S. Appl. No. 15/004,753 , "Notice of Allowance", dated Apr. 1, 2020, 8 pages.

U.S. Appl. No. 15/004,753 , "Supplemental Notice of Allowability", dated Apr. 13, 2020, 4 pages.

Application No. CA2,919,113 , Office Action, dated Sep. 3, 2021, 5 pages.

KR Patent Application No. 10-2022-7039056, Notice of Reasons for Rejection, dated Dec. 22, 2022.

Application No. KR10-2016-7005086 , Office Action, dated Dec. 14, 2020, 13 pages.

PROCESSING ELECTRONIC TOKENS

CROSS-REFERENCE TO RELATED APPLICATIONS

This application is a continuation of U.S. patent application Ser. No. 15/004,753 filed on Jan. 22, 2016 which is a continuation of International Application No. PCT/GB2014/052298, filed Jul. 25, 2014, which claims the benefit of GB Application No. 1313310.3, filed Jul. 25, 2013. Each of the above-referenced patent applications is incorporated by reference in its entirety.

BACKGROUND OF THE INVENTION

Field of the Invention

The present invention relates to the processing of electronic tokens, and in particular but not exclusively, to the processing of electronic tokens transferred between users of a communication system.

Description of the Related Technology

The transfer of a limited resource from one party to another has historically involved the physical exchange of that resource, or the exchange of currency in lieu of the underlying physical resource. With the advent of the internet, the transfer of currency from person to person by virtual means has increased significantly. Typically, both parties require accounts with a financial institution, such that funds can be transferred from an account associated with one party to an account associated with the other party.

As an alternative to transferring funds between accounts, currency may be alternatively exchanged directly, for example for goods and services, in which case a recipient of the funds may not need to have an account with a financial institution. Applying this model to a communications network such as the internet however raises a number of security concerns. The widespread availability of access to the internet, and the interconnected nature of its components drastically increases the susceptibility of connected resources to attacks from malicious parties. Removing the association between an amount of funds transferred to a recipient and a holding account increases the exposure of those funds to the potential for theft.

This problem is broader than the field of payment systems, and applies to the transfer of electronic data to an accountless recipient in general. If no recipient account information is stored against the transferred data, it becomes difficult to confirm that a user transacting with that data is indeed the authorized recipient of the data. Hence, it would be desirable to provide a measures for processing electronic data that address some or all of these concerns.

SUMMARY

In accordance with embodiments of the present invention, there is provided a method, apparatus and computer software for processing an electronic token according to the appended claims.

More specifically, in a first aspect, there is provided a method for processing an electronic token, the method comprising: receiving an authorization request in relation to processing of a said electronic token, the authorization request comprising the electronic token or an identifier for the electronic token; determining, on the basis of the authorization request, an identifier for a user terminal associated with the electronic token and an account, wherein the user terminal is capable of conducting communications via a wireless communication network, and wherein the account is independent of a user of the user terminal; performing a location query for the user terminal on the basis of the determined identifier, whereby to determine a location of the user terminal relative to one or more wireless access nodes in the wireless communication network; and selectively authorizing processing of the electronic token in relation to the account on the basis of a result of the location query.

Hence, by performing a location query for the user terminal, a measure of confidence can be determined regarding whether the determined identifier corresponds to the user terminal that is attempting to transact with the electronic token, therefore providing an effective basis for selectively authorizing processing of the electronic token.

In some embodiments, the user terminal comprises a cellular telecommunications terminal capable of conducting communications via a cellular telecommunications network. Hence, the location of the user terminal can be established via the cellular telecommunications network, which provides for location identification techniques that are relatively more secure and less susceptible to interception or manipulation compared to alternative methods.

According to embodiments, the identifier for the user terminal comprises a telephone dialing number. Hence the user terminal may be uniquely identified within a telephone network, such as a cellular telecommunications network, on the basis of the identifier.

In some arrangements, the authorization request is received from a transacting entity, and the selective authorization of the electronic token comprises comparing a result of the location query with a location of the transacting entity. Hence, by determining that the user terminal is at, or near, the physical location of the transacting entity, a high level of confidence that the identified user terminal is the user terminal attempting to transact with the electronic token can be determined.

In embodiments, at least a part of the electronic token is cryptographically signed. Hence, integrity and/or message origin authentication can be provided to those portions of the electronic token to prevent manipulation by a malicious third party, and thereby improve the security of the system.

In some embodiments, the electronic token comprises an indicator for a value of currency to be represented by the electronic token, and funds are held equal to the indicated currency value at the account. Hence, it can be ensured that subsequent transactions with the electronic token can be settled during a transaction with the electronic token.

In some arrangements, the electronic token comprises one or more condition parameters for restricting processing of the electronic token. Hence, the types of transactions that can be made using the electronic token may be limited by the sending user, for example, in order to prevent the electronic token from being redeemed outside of certain predefined geographical locations or areas, or to prevent recipients that are minors from attempting to purchase alcohol or other age restricted products/services.

According to further aspects, there is provided a method for processing an electronic token, the method comprising: receiving an authorization request in relation to processing of a said electronic token presented by a transacting user terminal, the authorization request comprising the electronic token or an identifier for the electronic token; determining, on the basis of the authorization request, an identifier for a designated user terminal associated with the electronic token and an account, the account being independent of a user of the receiving user terminal; performing an authorization process on the basis of the determined identifier, whereby to establish a confidence that the transacting user terminal is the designated user terminal, wherein the authorization process comprises: transmitting a challenge message to the designated user terminal on the basis of the determined identifier; and receiving a challenge response message corresponding to the transmitted challenge message, wherein said selective authorization is performed at least on the basis of the received challenge response message; and selectively authorizing processing of the electronic token in relation to the account on the basis of the established confidence.

Hence, approval from the intended recipient of the electronic token may be obtained prior to authorizing processing of the electronic token.

According to still further aspects of the present invention there are provided apparatus for processing an electronic token according to one or more of the aforesaid methods, and computer programs, each comprising a set of instructions, which, when executed by a computing device, cause the computing device to perform one or more of the aforesaid methods.

Further features and advantages of the invention will become apparent from the following description of embodiments of the invention, given by way of example only, which is made with reference to the accompanying drawings.

DETAILED DESCRIPTION OF CERTAIN INVENTIVE EMBODIMENTS

The present disclosure enables the transfer of data to a user terminal associated with a recipient in the form of an electronic token. The electronic token may then be supplied by the user terminal to a further entity for processing. Authentication systems are provided which facilitate a measure of certainty that the user terminal is authorized to transact with the electronic token.

Figure 1:
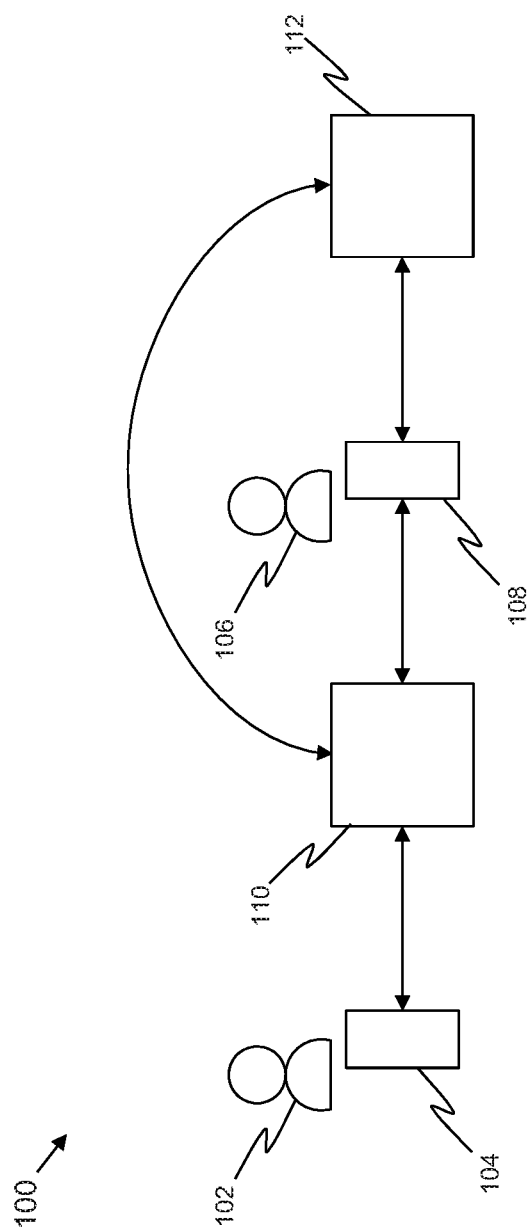
FIG. 1 shows an example communications network according to one or more embodiments of the present invention.

FIG. 1 illustrates an example communications network 100 in which embodiments of the present disclosure may be practiced. Sending user 102 is associated with sending user terminal 104. Similarly, receiving user 106 is associated with user receiving terminal 108. User terminals 104 and 108 may be, for example, personal computers, laptop computers, personal digital assistants (PDAs), mobile telephony devices (such as cellular telephones), tablet computers etc. Sending user 102 is the holder of an account with a service provider responsible for providing the token processing services of the present disclosure. In embodiments, the service provider may be, for example, a financial institution, an internet based service provider, an access control service provider, or a mobile network operator.

Sending user terminal 104 is capable of conducting communications with a service provider entity 110 via communications network 100, for example via the internet. According to embodiments, service provider entity 110 is a server, or set of servers, which are responsible for conducting one or more of the services offered by the service provider, including the electronic token processing services of the present disclosure and/or provide access to those services via communications network 100 to users which hold accounts with the service provider, including sending user 102. Service provider entity 110 is also capable of conducting communications with receiving user terminal 108 via communications network 100 such as the internet.

Service provider entity 110 is further capable of conducting communications with transacting entity 112 via communications network 100 such as the internet. Communications between service provider entity 110 and one or more of sending user terminal 104, receiving user terminal 108 and transacting entity 112 may be conducted via one or more intermediate proxy entities or services (not shown). Transacting entity 112 is configured to receive and process electronic tokens presented during transactions with user devices, such as receiving user terminal 108. In some embodiments, receiving user terminal 108 may conduct communications with transacting entity 112 via a wired (or "contact") interface. In alternative embodiments, receiving user terminal 108 conducts communications with transacting entity 112 via one or more short range wireless communications protocols, such as near field communications (NFC) or the Institute of Electrical and Electronics Engineers (IEEE) standard 802.15 (Bluetooth). In some embodiments, receiving user terminal 108 conducts communications with transacting entity 112 through the respective display and recognition of an image displayed on the screen of receiving user terminal 108, such as a barcode or quick-response (QR) code. In further embodiments, receiving user terminal 108 conducts communications with transacting entity 112 via the internet.

Figure 2:
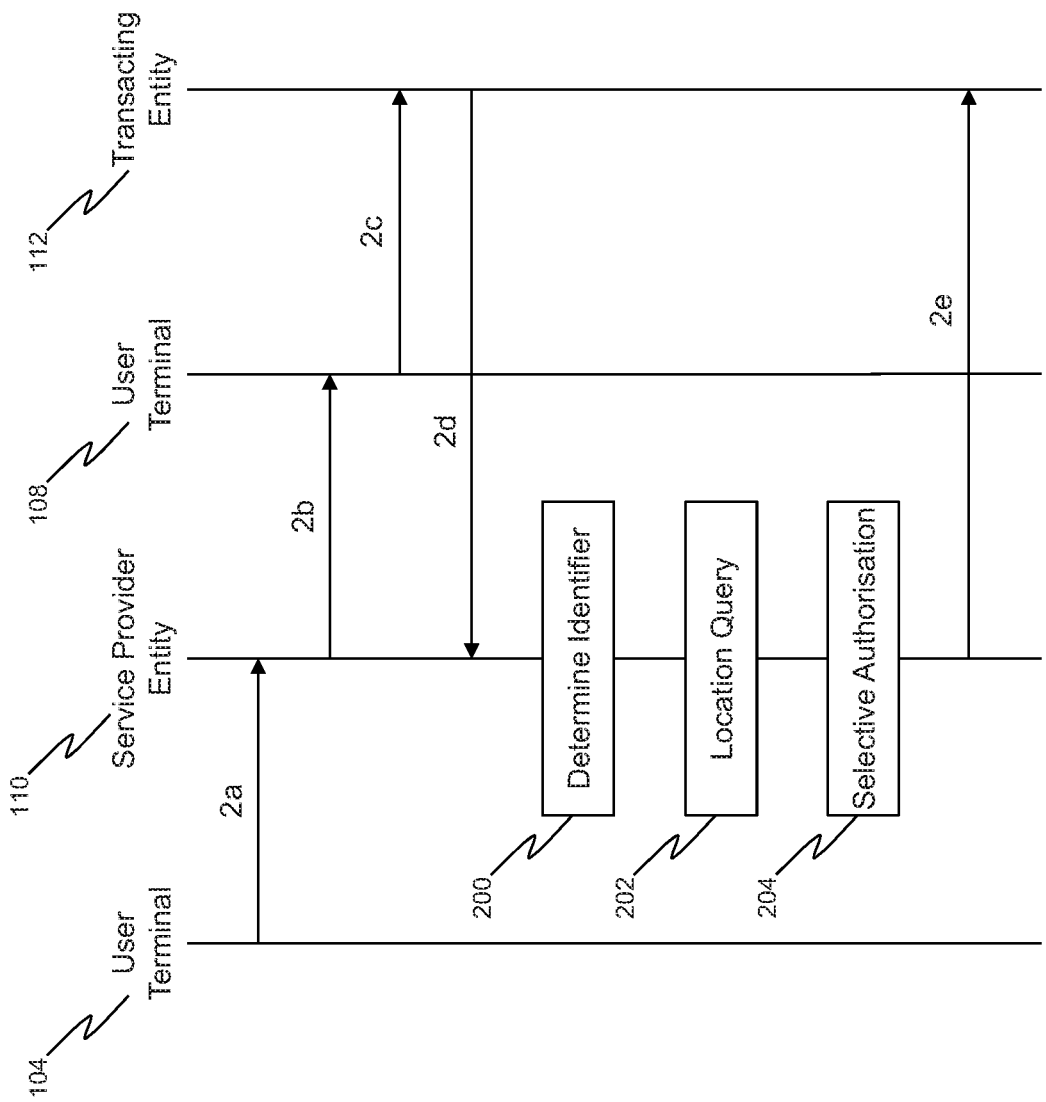
FIG. 2 shows a message flow diagram according to one or more embodiments of the present invention.

FIG. 2 shows a message flow diagram, illustrating the operation of the various entities in communication network 100 during the processing of an electronic token according to embodiments. At the start of the messaging flow, sending user 102 of sending user terminal 104 decides to send an electronic token to receiving user 106 of receiving user terminal 108. As a result of a user interaction with user sending terminal 104 by sending user 102, token transfer initiation message 2a is transmitted to service provider entity 110. This token transfer initiation message 2a comprises at least an identifier for receiving user terminal 108 (the desired recipient of the electronic token). The identifier for receiving user terminal 108 may be an email address, internet protocol (IP) address (such as internet protocol version 4 (IPv4) or version 6 (IPv6)), a telephone dialing number or other unique identifier within communication system 100. In some embodiments, sending user 102 may be authenticated (not shown) by service provider entity 110 prior to transmission of token transfer initiation message 2a. This may take the form of a "log-in" procedure, and involve the sending user 102 entering credentials such as a username and password to be used in an identity verification process.

In response to receipt of token transfer initiation message 2a, service provider entity 110 transmits token transfer message 2b to receiving user terminal 108. Token transfer message 2b comprises the electronic token to be transferred to receiving user terminal 108. As receiving user terminal 108 is the intended recipient of the electronic token, the electronic token is considered to be associated with receiving user terminal 108. In embodiments, token transfer message 2b is routed to user terminal 108 on the basis of the identifier for receiving user terminal 108 received in token transfer initiation message 2a. In some embodiments, the electronic token is generated by sending user terminal 104 prior to the transmission of token transfer initiation message 2a, and is included within token transfer initiation message 2a. In such embodiments, the identifier for receiving user terminal 108 in token transfer initiation message 2a may be included as a part of the electronic token. In alternative embodiments, the electronic token is generated by service provider entity 110 in response to receipt of token transfer initiation message 2a. In such embodiments, token transfer initiation message 2a may comprise one or more parameters required for the generation of the electronic token by service provider entity 110. The one or more parameters required for the generation of the electronic token may be encrypted and or cryptographically signed prior to transmission in order to provide one or more of confidentiality, integrity and non-repudiation.

Subsequent to receiving the electronic token in token transfer message 2b, receiving user terminal 108 is equipped to transact with the electronic token. Notably, it is not necessary for receiving user 106 to have an account with the service provider in order to hold and/or transact with the electronic token (it should be appreciated, however, that receiving user 106 can have an account and still make use of embodiments of the invention). Hence, receiving user 106 of receiving user terminal 108 is independent of the service provider account held by sending user 102.

In the embodiments depicted in FIG. 2, receiving user 106 of receiving user terminal 108 subsequently elects to transact with transacting entity 112. During the transaction processing, the electronic token is transmitted from receiving user terminal 108 to transacting entity 112 in transaction message 2c. In alternative embodiments, transaction message 2c may comprise an identifier for the electronic token. In response to receipt of transaction message 2c, transacting entity 112 transmits authorization request message 2d to service provider entity 110 in order to authorize the processing of the electronic token. According to embodiments, authorization request message 2d comprises the electronic token. In alternative embodiments, authorization request message 2d comprises an identifier for the electronic token.

In response to receipt of authorization request message 2d, service provider entity 110 is configured to determine an identifier for the user terminal that is associated with the electronic token at step 200, in this case receiving user terminal 108. The electronic token may comprise the identifier for receiving user terminal 108, in which case the identifier may be determined at step 200 by inspecting the electronic token received in authorization request message 2d. In some embodiments, service provider entity 110 may store a copy of the electronic token in memory when transmitting token transfer message 2b. In such cases, if authorization request message 2d does not comprise the electronic token, but instead contains only an identifier for the electronic token, then the identifier for receiving user terminal 108 may be determined at step 200 by inspecting the copy of the electronic token stored in memory that is identified by the electronic token identifier transmitted in authorization request message 2d.

Having determined, at step 200, an identifier for the user terminal associated with the electronic token received (or identified) in authorization request message 2d, service provider entity 110 is configured to perform an authorization process whereby to establish a confidence that the determined identifier corresponds to the user terminal that is attempting to transact with the electronic token, thereby providing an effective basis for selectively authorizing processing of the electronic token. One suitable such method involves determining the location of the user terminal corresponding to the determined identifier by means of a location query. As an alternative, a challenge could be sent to the user terminal corresponding to the determined identifier. For example, a short message service (SMS) message could be sent to the user terminal corresponding to the determined identifier requesting a response message to be sent back in order to approve the transaction. Alternatively, an Automated Voice Response (AVR) mechanism could be invoked, resulting in a call being placed to the user terminal corresponding to the determined identifier and requiring approval of the transaction via the AVR channel. In further arrangements, the user may be required respond to the challenge message via transacting entity 112. For example, a challenge response given to transacting entity 112, may result in a challenge response message being transmitted from transacting entity 112 to service provider entity 110 for using in completing the authorization process.

Alternatively still, embodiments may comprise pre-configuring an out of band communications channel for receiving user 106, for example at the time the electronic token is created, and storing details of this configuration in memory at service provider entity 110. In some arrangements, the out of band channel may be configured by sending party 102, and may relate to a device associated with receiving user 106 that is not receiving user terminal 108. Once the user terminal corresponding to the determined identifier has been identified, the service provider entity 110 may further identify the pre-configured out of band communications channel for receiving user 106 on the basis of the details stored in memory. A challenge may then be sent to receiving user 106 via the pre-configured out of band channel, requesting a response to the challenge in order to approve the transaction. In some embodiments, the authorization process may comprise a combination of the aforementioned methods in order to establish with a higher degree of confidence that the user terminal corresponding to the determined identifier is the user terminal attempting to transact with the electronic token. For example, the authorization operation may comprise both performing a location query for the user terminal corresponding to the determined identifier and sending a challenge message to the user terminal corresponding to the determined identifier.

In further arrangements, the authorization process may comprise determining whether transacting entity 112 is at, or near to, either a predefined location, one of a group of predefined locations or within a predefined area or group of predefined areas. These predefined locations or areas may be defined by sending user 102 during the creation of the electronic token for example. The location of transacting entity 112 may be determined by referencing a database of known transacting entity locations, or may be comprised within authorization request message 2d.

FIG. 2 is directed towards an embodiment in which the aforementioned location is used as the basis for authorizing processing of the electronic token. Specifically, in this embodiment the service provider entity 110 is configured to perform a location query with respect to the identified user terminal at step 202. On the basis of the results of the location query, service provider entity 110 is configured to selectively authorize processing of the electronic token at step 204. In some embodiments, selective authorization of the electronic token may be performed additionally on the basis of validation of the electronic token. In response to the selective authorization of the processing of the electronic token, service provider entity 110 may transmit authorization response message 2e to transacting entity 112.

In embodiments where the transaction includes a transfer of value, authorization of the processing of the electronic token may cause the transaction to be settled between transacting entity 112 and the service provider account held by sending user 102. The service provider account held by sending user 102 may be identified in the electronic token. Alternatively, the service provider account held by sending user 102 may be identified to service provider entity 110 as a result of having received token transfer initiation message 2a from sending user device 104 associated with sending user 102, or as a result of a preceding log-in procedure between sending user 102 and service provider entity 110 via sending user device 104. Hence, transfer of the electronic token to receiving user terminal 108 enables receiving user 106 to conduct one or more transactions using the electronic token, without requiring receiving user 106 to have an account with the service provider. In some such embodiments, and in response to receipt of token transfer initiation message 2a, service provider entity 110 may provision the account of sending user 102 to ensure that the electronic token can subsequently be used to settle transactions. Hence, the service provider account held by sending user 102 may be subsequently considered to have been "pre-provisioned".

The location query performed by service provider entity 110 at step 202 may involve requesting the current or last known location of the identified user terminal (and possibly the amount of time elapsed since the last known location of the identified user terminal), in this case receiving user terminal 108. For example, the location of user terminal 108 may be determined by transmitting a location request message to receiving user device 108 and receiving a corresponding location response message from receiving user terminal 108, the response message comprising data indicating a current or last known location of receiving user terminal 108. In some such embodiments, receiving user terminal 108 may be configured to determine its location using, for example, the global positioning system (GPS). In further such embodiments, receiving user terminal 108 is configured to automatically respond to the location request message with a location response message comprising its current location. In alternative embodiments, receiving user terminal 108 may be configured to transmit a location response message that includes a unique identifier for a wireless internet access point (for example an IEEE standard 802.11 compliant access point) with which the user terminal is currently associated. On the basis of this wireless access point identifier, service provider entity 110 may determine, with some degree of accuracy, the location of user terminal 108, for example by referencing a table of wireless internet access point locations. Such a table may be stored in memory at service provider entity 110, or be accessible to service provider entity 110 via communications network 100.

In embodiments, the location of user terminal 108 may be determined by obtaining location information for user terminal 108 from a wireless communication network with which user terminal 108 is capable of conducting communications. In such embodiments, the location of user terminal 108 may be determined relative to one or more wireless access nodes in the wireless communication network. For example, in the context of the wireless internet access network described above, an identifier for the particular wireless internet access point identifier with which user terminal 108 is associated may be determined by the wireless internet access network without requiring that information to be reported by user terminal 108. A location entity may be provided in the wireless communication network which is responsible for determining and/or monitoring the location of user terminal 108 relative to one or more wireless access nodes in the wireless communication network. In some embodiments, the wireless communication network may be a cellular telecommunications network, and the wireless access nodes may be base stations in the cellular telecommunications network. Use of a cellular network cell ID for the purposes of determining location of the receiving user terminal 108 is described below with reference to FIGS. 3 and 4.

Having determined the location of the user terminal associated with the electronic token at step 202, service provider entity 110 is configured to selectively authorize the processing of the electronic token in step 204, as will now be explained. In some embodiments, the selective authorization comprises determining whether the user terminal identified at step 200 is at, or near to, either a predefined location, one of a group of predefined locations or within a predefined area or group of predefined areas. These predefined locations or areas may be defined by sending user 102 during the creation of the electronic token for example. In the embodiments depicted in FIG. 2 however, the selective authorization comprises determining whether the user terminal identified at step 200 is in the same (or a similar) location as the user terminal attempting to transact with the electronic token with transacting entity 112 (i.e. the user terminal that sent message 2d to transacting entity 112). If so, service provider entity 110 may establish a high confidence that the user terminal attempting to transact with the electronic token is in fact the user terminal identified at step 200, and service provider entity 110 may be configured to authorize processing of the electronic token, for example by transmitting a positive authorization response message 2e to transacting entity 112. However, if the user terminal identified at step 200 is not in the same location as (or is more than a predetermined distance from) the user terminal attempting to transact with the electronic token, it can be assumed that the user terminal attempting to transact with the electronic token is not the user terminal identified at step 200. In such cases, the user terminal attempting to transact with transacting entity 112 may be a fraudulent user terminal which has maliciously obtained the electronic token, and hence service provider entity 110 may be configured to not authorize (i.e. decline) processing of the electronic token, for example by transmitting a negative authorization response message 2e to transacting entity 112. The determination of whether the user terminal identified at step 200 is in the same (or a similar) location as the user terminal attempting to transact with the electronic token may comprise comparing the result of the location query performed at step 202 with a determined location of the user terminal attempting to transact with transacting entity 112. In embodiments, a threshold level of similarity may be used when judging whether the user terminals are in the "same" location, to account for uncertainties or temporal variations in the reported locations.

The location of the user terminal attempting to transact with transacting entity 112 may be included in authorization request message 2d. In embodiments wherein receiving user terminal 108 must be physically present at the location of the transacting entity, for example when the means of communication between transacting entity 112 and user terminal is a wired communication link, a short range wireless communication link or a barcode reader, transacting entity 112 may include its own, known location in authorization request message 2*d*, as this will be the same as the location of the user terminal attempting to transact with transacting entity 112, with an uncertainty equal to the range of the communication link between the user terminal and transacting entity 112. In arrangements wherein transacting entity 112 is located at a fixed geographical location, authorization request message 2*d* may alternatively, or additionally, comprise an identifier for the transacting entity. In such embodiments, service provider entity 110 may determine the location of transacting entity 112 by referencing a table of known transacting entity locations. Such a table may be stored in memory at service provider entity 110, or be accessible to service provider entity 110 via communications network 100.

In embodiments wherein user terminal 108 need not be physically present at the location of transacting entity 112, for example in embodiments in which receiving user terminal 108 conducts communications with transacting entity 112 via the internet, the location of the terminal attempting to transact with transacting entity 112 may be determined on the basis of the messages exchanged between the user terminal and transacting entity 112, such as transaction message 2*c*. In the case of internet based communication for example, the location may be determined on the basis of an IP address associated with the user terminal attempting to transact with transacting entity 112. IP addresses are used in the routing of packets via the internet and each IP address can be equated with reasonable certainty to a particular geographic location. The IP address of the user terminal attempting to transact with transacting entity 112 may be included in transaction message 2*c* for example, and/or one or more further messages (not shown) exchanged between the user terminal and transacting entity 112 prior to the transmission of transaction message 2*c*.

Figure 3:
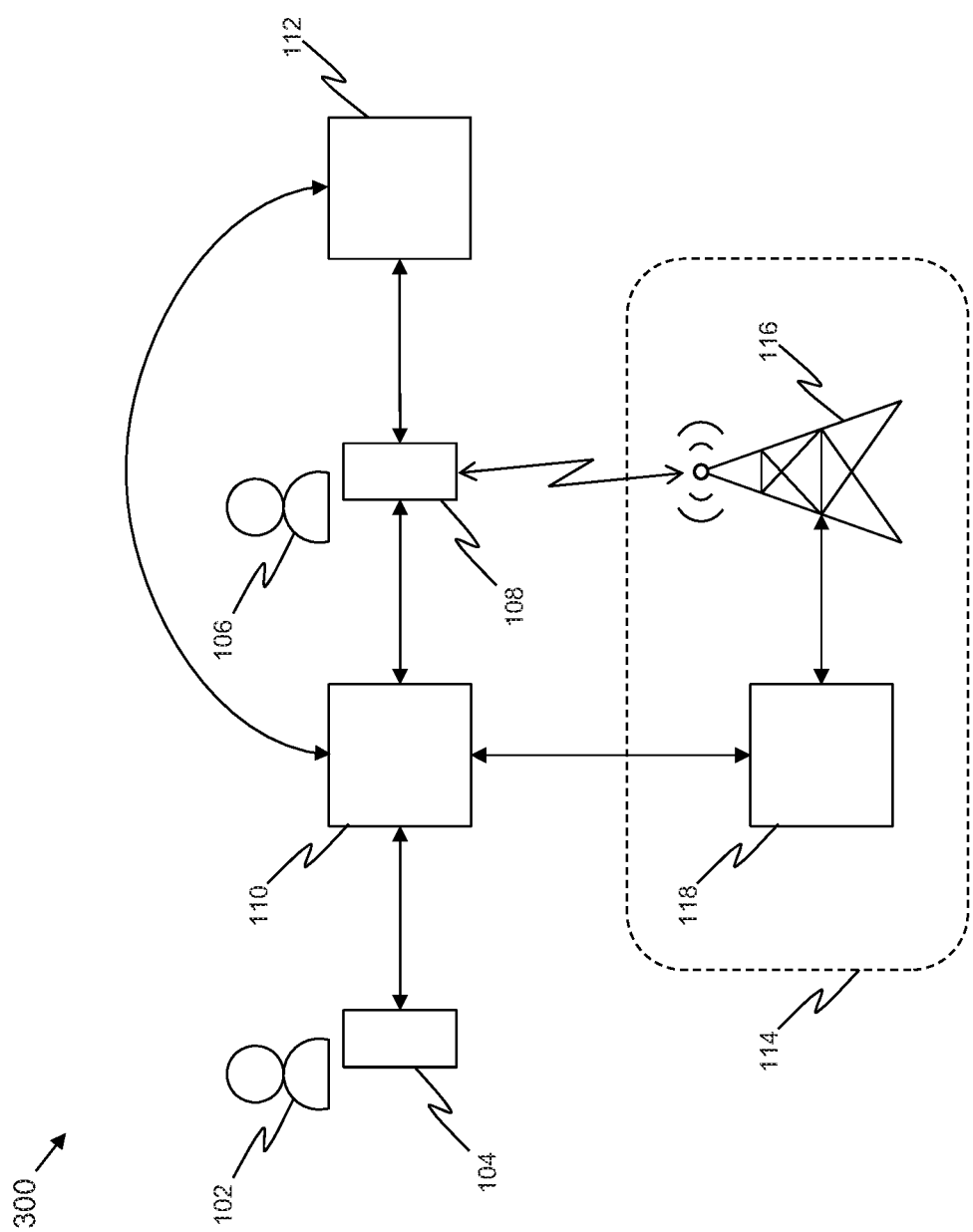
FIG. 3 shows an example communications network according to one or more embodiments of the present invention.

FIG. 3 illustrates another example communications network 300 in which embodiments of the present disclosure may be practiced. Sending user 102, receiving user 106, sending user terminal 104, service provider entity 110, and transacting entity 112 are equivalent to the corresponding entities described previously in relation to FIG. 1. In the embodiments depicted in FIG. 3, receiving user terminal 108 comprises a cellular telecommunications terminal, capable of conducting communications via a cellular telecommunications network 114. Cellular telecommunications network 114 may be, for example a Global System for Mobile Communications (GSM) network. User terminal 108 conducts communications via cellular telecommunications network 114 by associating with one or more cellular access points, such as base station 116.

Cellular telecommunications network 114 further comprises a location entity 118, which is responsible for determining, recording and/or reporting the location of cellular telecommunication devices associated with cellular telecommunications network 114, including user terminal 108. Location entity 118 may comprise a single entity, such as a server, or a plurality of such entities. Service provider entity 110 is capable of conducting communications with location entity 118 via communications network 110 such as the internet. In some arrangements, service provider entity 110 and location entity 118 may conduct communications via one or more intermediate entities, such as gateway or border control entities, necessary for handling the conversion of messages between cellular telecommunications network 114 and the wider telecommunications network 300. In the case of network configurations including 3G-enabled GSM networks, location entity 118 may comprise a location register, such as a Home Location Register (HLR); in the case of Long Term Evolution (LTE) networks, location entity 118 may comprise a Home Subscriber Server (HSS). Location entity 118 may alternatively or additionally comprise an application server or other processing entity that is communicatively connected to one or more base stations and/or location registers in cellular telecommunications network 114 and is configured to provide an interface for service provider entity 110 to access the location information for cellular telecommunication devices stored at or reported by the aforementioned base stations and location registers. Location entity 118 may include a bespoke location finding equipment that is configured to derive location-based information from e.g. base stations as they communicate with cellular telecommunications terminals.

In further embodiments, receiving user 106 is subscribed to an Intelligent Network (IN) service for receiving user terminal 108 which is configured to report the location of receiving user terminal 108. As a result of this subscription, an IN trigger is stored in a location register (such as the HLR) against data for receiving user terminal 108. In such cases, when receiving user terminal 108 associates with a base station, such as base station 116, subscriber data for that user terminal is read from the location register, which results in the aforementioned IN service being invoked. Association with a base station may for example take the form of a location update or cell update procedure. The IN service is configured to report the location of receiving user terminal 108 to location entity 118 which stores the location data and provides an interface for service provider entity 110 to access the stored location data. Reporting of the location of receiving user terminal 108 to location entity 118 by the IN service may take place via one or more intermediate entities, such as service control points (SCPs). Providing service provider entity 110 with access to location data for receiving user terminal 108 may require authorization from receiving user 106.

The location of a given cellular telecommunications terminal associated with cellular telecommunications network 114 may be determined on the basis of the location of the base station with which the given telecommunications terminal is currently associated. This is referred to as a "cell ID", and will typically be derived from the closest base station to the given user terminal and will have the same location as the given user terminal, within an uncertainty equal to the range of the base station. If more accuracy is required, a trilateration operation can be performed using known distances to three or more of the nearest base stations to the given user terminal (calculated based on the relative times of receipt of messages sent between the given user terminal and each of the base stations). Alternative techniques, such as triangulation may also be available in certain cellular telecommunications networks.

In embodiments, if the location of receiving user terminal 108 cannot be determined, for example because of poor signal quality, a last known location of the receiving user terminal 108 may be used. In such cases, the similarity required between the location of receiving user terminal 108 and the user terminal attempting to transact with transacting entity 112 may be relaxed in order to account for subsequent movement of receiving user terminal 108 since its last known location. In alternative embodiments, authorization of the processing of the electronic token is declined if the location of receiving user terminal 108 cannot be determined.

Figure 4:
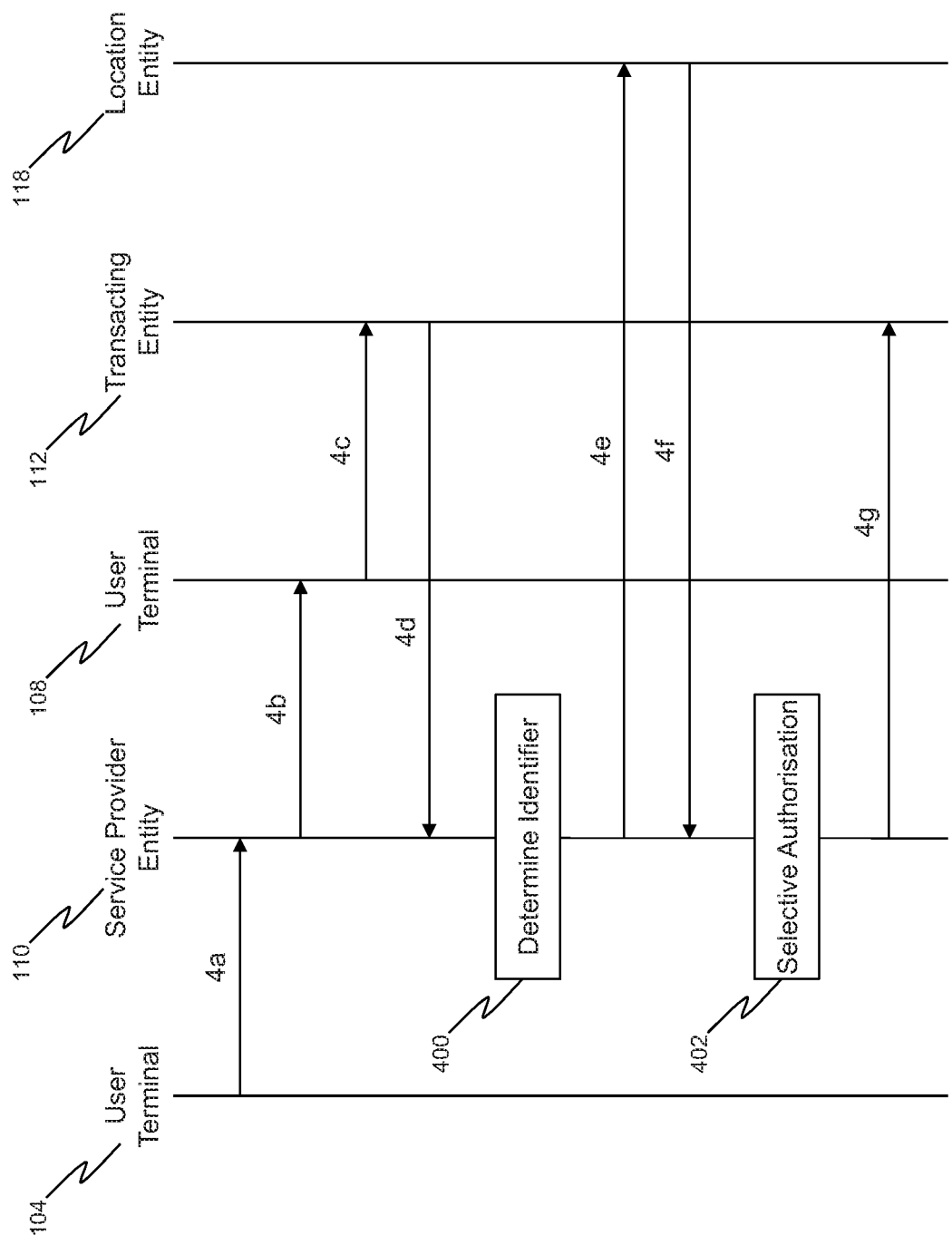
FIG. 4 shows a message flow diagram according to one or more embodiments of the present invention.

FIG. 4, shows a message flow diagram, illustrating the operation of the various entities in communication network 300 during the processing of an electronic token according to embodiments. At the start of the messaging flow, sending user 102 of sending user terminal 104 decides to send an electronic token to receiving user 106 of receiving user terminal 108. As a result of a user interaction with sending user terminal 104 by sending user 102, token transfer initiation message 4a is transmitted to service provider entity 110. Token transfer initiation message 4a comprises an identifier for receiving user terminal 108 (the desired recipient of the electronic token). According to the embodiments depicted in FIG. 4, wherein user terminal 108 is a cellular telecommunication device, the identifier for user terminal 108 may be an externally routable identifier such as a telephone dialing number (Mobile Station Integrated Services Digital Network (MSISDN)). In response to receipt of token transfer initiation message 4a, service provider entity 110 transmits token transfer message 4b to receiving user terminal 108. Token transfer message 4b comprises the electronic token to be transferred to receiving user terminal 108, and is routed to receiving user terminal 108 on the basis of the identifier for receiving user terminal 108 received in token transfer initiation message 4a.

Subsequent to receiving the electronic token in token transfer message 4b, receiving user terminal 108 is equipped to transact with the electronic token. In the embodiments depicted in FIG. 4, receiving user 106 of receiving user terminal 108 subsequently elects to transact with transacting entity 112. During the transaction processing receiving user terminal 108 transmits transaction message 4c to transacting entity 112. In response to receipt of transaction message 4c, transacting entity 112 transmits authorization request message 4d to service provider entity 110 in order to authorize the processing of the electronic token.

In response to receipt of authorization request message 4d, service provider entity 110 is configured to determine an identifier for the user terminal that is associated with the electronic token in step 400, in this case user terminal 108, as described previously in relation to FIG. 2. Having determined an identifier for the user terminal associated with the electronic token received (or identified) in authorization request message 4d, service provider entity 110 is configured to perform a location query with respect to the identified user terminal. In the embodiments depicted in FIG. 4, service provider entity 110 does so by transmitting location request message 4e to location entity 118 with respect to the user terminal identified at step 400. Location entity 118 responds with location response message 4f which comprises location data for the user terminal identified at step 400. On the basis of the results of the location query, service provider entity 110 is configured to selectively authorize processing of the electronic token at step 402 as described above in relation to FIG. 2. In response to the selective authorization of the processing of the electronic token, service provider entity 110 may transmit authorization response message 4g to transacting entity 112.

Hence, the location of the identified user terminal may be as a result of obtaining the location data from an entity in cellular telecommunications network 112, which may be considered to be a more trusted source of location information, and therefore more secure and less susceptible to interception or manipulation than alternative means (such as GPS information reported by the identified user terminal).

In embodiments, the electronic token is used to transfer data from sending user 102 to receiving user 106. In some embodiments, the electronic token may be used to enable a level of access to one or more physical or virtual systems for receiving user 106. For example, the electronic token may enable physical access to a particular location or set of locations, or may enable access to one more electronic or 'virtual' systems, such as computer systems or services. In this manner, a user without an account for such a physical or virtual system may be enabled to access that system by sending user 102.

For example, access to a physical location, such as a corporate premises, may be controlled by an access control service provider or system. Workers at such a restricted access environment may have user accounts with the access control system in order to facilitate their access at the premises, for example through the use of electronic access devices such as key cards or proximity tags. In order to provide a visitor to the restricted access environment with access to the premises, the user that they are visiting, i.e. sending user 102, may transmit an electronic token to the visitor, i.e. receiving user 106, which provides them with access to the restricted access environment. Receiving user 106 is then equipped to transact with one or more access terminals in the restricted access environment, such as turnstiles or door release mechanisms, using the electronic token.

Similarly, in a virtual access system, access to one or more computational resources may be restricted. For example, users may have user accounts with an access control system which enables the corresponding user to log-in to a particular computer or workstation, access restricted data, or conduct processing functions which require elevated access privileges, for example. In such embodiments, in order to provide a visitor with access to the virtual systems, the user that they are visiting, i.e. sending user 102, may transmit an electronic token to the visitor, i.e. receiving user 106, which provides them with such access.

The level of access provided by the electronic token may be configured by sending user 102. For example, in the case of a physical access system, sending user 102 may configure which locations the electronic tokens provides access to, i.e. the electronic token may provide access to a meeting room and the restrooms, but not private offices. In the case of a virtual access system, sending user 102 may configure which files or processing functions that the electronic tokens provides access to, or may configure what actions receiving user 106 may performed with respect to those files or processing functions. For example, the electronic token may provide receiving user 106 with access to a particular file or set of files, but not allow receiving user 106 to modify or delete those files.

In some embodiments, the level of access granted by the electronic token may be restricted by the level of access entitled to be granted by sending user 102. The level of access entitled to be granted by sending user 102 may be determined by the service provider account of sending user 102. For example, sending user 102 may not be able to grant a level of access to the system that they do not have themselves. For the purposes of processing access attempts made using the electronic token, the service provider account of sending user 102 may be used to authorize the access with the respective physical or virtual system.

In embodiments, the electronic token is used to transfer value from sending user 102 to receiving user 106. This value may be in the form of funds of a specified or predetermined monetary value in a given currency. In such embodiments, the service provider may be a financial service provider. Sending user 102 may define the value of funds to be transferred to receiving user 106 in token transfer initiation message 2a, 4a. In alternative embodiments, an electronic token may have a predetermined value, in which case, and after receipt of the token transfer message 2b, 4b at receiving user device 108, receiving user 106 is equipped to conduct one or more transactions up to the value of the electronic token. If a transaction with the electronic token is subsequently approved by service provider entity 110, funds may thereafter be settled between the service provider account held by sending user 102 and transacting entity 112.

As described previously, in response to receipt of token transfer initiation message 2a, 4a, service provider entity 110 may provision the service provider account associated with sending user 102 in order to ensure that subsequent transactions with the electronic token can be settled. In embodiments wherein the electronic token is used to transfer monetary value, provisioning of the account held by sending user 102 may involve holding funds in the account equal to the value of the token. Alternatively, funds equal to the value of the token may be transferred into the holding account, in which case, subsequent authorized transactions using the electronic token are settled between the holding account and the transacting entity.

In some arrangements, transacting entity 112 is a merchant entity. A merchant entity may be for example a point of sale (PoS) device at a merchant's premises, in which case the electronic token may be used to pay the merchant for goods or services up to the value of the electronic token. Alternatively, the merchant entity may be an automated teller machine (ATM), in which case the electronic token may be used to withdraw physical currency up to the value of the electronic token. Alternatively still, the merchant entity may be a server associated with an internet based (or "online") merchant, in which case the electronic token may be used to purchase goods or services over the internet up to the value of the electronic token.

The electronic token comprises one or more data parameters to be used in identification of the recipient and possibly sender of the electronic token. In embodiments, the electronic token comprises an identifier for the intended recipient user terminal, i.e. receiving user terminal 108. One or more of the parameters of the electronic token may be cryptographically encrypted and/or signed in order to provide integrity (i.e. prevent manipulation by a malicious third party) and/or to provide message origin authentication. The integrity and/or origin of the electronic token may be determined by service provider entity 110 during a validation procedure for the electronic token, which may be performed, for example, in response to receipt of token transfer message 2b and/or authorization request message 2d. If the electronic token is generated at sending user terminal 102, the electronic token may be, for example, cryptographically signed using a private key associated with sending user 102. In such embodiments, service provider entity 110 is ensured that the contents of the electronic token are the genuine instructions of sending user 102. In some arrangements, the user identifier of the receiving user device 108 is one of the cryptographically signed parameters. In such cases, the electronic token may be considered to be bound to receiving user device 108, as the contents of the token cannot be manipulated by a malicious third party that has obtained the electronic token in order to replace the identifier for receiving user device 108 with that of their own fraudulent user device.

In arrangements in which the electronic token is used to enable a level of access to one or more physical or virtual systems, the electronic token may comprise a parameter defining the level of access to be enabled by the token. Such an access level parameter may define the locations, data or processing functions that the recipient is entitled to access. The access level parameter may be one of the cryptographically signed parameters. In such cases, the access level of the electronic token cannot be manipulated by a malicious party in order to attempt to use the token to gain a level of access that is greater than the intended level.

In arrangements in which the electronic token is used to transfer monetary value, the electronic token may comprise a parameter defining the monetary value to be transferred by the token, and may be one of the cryptographically signed parameters. In such cases, value of the electronic token cannot be manipulated by a malicious party in order to attempt to conduct transactions that are higher than the intended monetary value.

The electronic token may further comprise a parameter for identifying sending user 102 to service provider entity 110. Service provider entity 110 may, for example, use this parameter to verify the identity of sending user 102. In embodiments, the identifier for sending user 102 may be encrypted or hashed prior to inclusion in the electronic token in order to maintain the anonymity of sending user 102 to any other parties that obtain the electronic token (such as receiving user 106 and transacting entity 112). For example, a hashed identifier for sending user 102 may still be used by service provider entity 110 to verify the identity of sending user 102, as the identifier for the expected user may be hashed and compared to the hashed identifier in the electronic token. This arrangement maintains the anonymity of sending user 102 to other entities, as performing determining the reverse of the hashing function is prohibitively computationally intensive. An encrypted identifier for sending user 102 may be decrypted by service provider entity 110 in order to determine or verify the identity of sending user 102. In a similar manner, a parameter in the electronic token comprising identifier for receiving user 106 and/or receiving user terminal 108 may be encrypted in order to maintain the anonymity of receiving user 106 to transacting entity 112. Alternatively, prior to transmission of the token to transacting entity 112, the whole electronic token may be encrypted in order to preserve the secrecy of all of the parameters stored therein.

The electronic token may yet further comprise a number of conditions that limit the processing of the electronic token. These conditions may be defined by sending user 102 and transmitted in token transfer initiation message 2a, 4a, either as part of the electronic token (if the token is generated by sending user terminal 104) or for inclusion in the electronic token (if the token is generated by service provider entity 110). The conditions may for example define limitations on the types of goods and services that may be purchased or obtained with the electronic token. For example, the conditions may prevent the purchase of age restricted products such as tobacco and alcohol, or prevent use of the electronic token for the withdrawal of physical currency. The authorization request message 2d, 4d may also comprise an indication of the nature of the transaction to be approved, such as the type of goods and services or whether the transaction if for physical currency. This enables service provider entity 110 to check the transaction information against the conditions of the electronic token, and selective authorization of the processing of the electronic token is further performed on the basis of the one or more condition parameters. For example if the transaction information satisfies the conditions and the location of the identified user terminal is the same as (or similar to) the location of the user terminal attempting to transact with transacting entity 112, then the transaction is approved. Otherwise, the transaction may be declined.

The electronic token may also comprise one or more further parameters for use in analytics or fraud detection. For example, the electronic token may contain the geographic location of the entity that generated it, or the time and date that it was generated. The electronic token may also comprise an expiry date and/or time in order to limit the duration of the electronic token. In embodiments, the electronic token is no longer valid after the expiry date/time has passed and processing of the electronic token will no longer be authorized. In some such embodiments, the held or transferred funds equal to the value of the token are released or returned to the service provider account associated with sending user 102 if the token expires without being used in a transaction.

Whilst in the embodiments described above, the electronic token is described as being sent to receiving user terminal 108 by service provider entity 110, in alternative embodiments, the electronic token is generated by sending user terminal 104 and sent directly from sending user terminal 104 to receiving user terminal 108. In such cases, the service provider account held by sending user 102 is not pre-provisioned by service provider entity 110 in respect of the electronic token. Instead, the electronic token is received by the service provider entity for the first time in authorization request message 2d, 4d, and may comprise an identifier for sending user 102, and/or the service provider account held by sending user 102. The authenticity of the electronic token may be verified by service provider entity 110 if it is cryptographically signed by sending user terminal 104, and assuming the service provider 110 has access to the data that can be used to decrypt the electronic token. If the location requirements and any other conditions are met, then the processing of the electronic token may be authorized. For example, for a token used to grant a level of access to one or more physical or virtual systems, if the level of access required for a particular access attempt is within the access level of the electronic token, then access may be provided using the service provider account held by sending user 102. For a monetary transaction, if the transaction value is within a specified limit of the electronic token, and provided there are sufficient funds available in the service provider account held by sending user 102, the transaction may be settled between the service provider account held by sending user 102 and an account associated with transacting entity 112.

The above embodiments are to be understood as illustrative examples of the invention. Further embodiments of the invention are envisaged. For example, in some embodiments, once the electronic token has been received by receiving user terminal 108, receiving user 106 may elect to transfer that token on to a further user terminal, rather than using the electronic token to transact with a transacting entity, such as transacting entity 112. In such embodiments, receiving user 106 may be required to communicate with service provider entity 112 in order modify the electronic token and/or associated data stored by service provider entity 110 such that the further user terminal becomes associated with the electronic token. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for processing an electronic token, the method comprising:

receiving, by a server computer, an authorization request in relation to processing of an electronic token comprising an identifier for a first user terminal from a transacting entity, the authorization request comprising the electronic token or an identifier for the electronic token, and an electronic signature formed by a second user terminal using a cryptographic key bound to the second user terminal to sign the identifier for the first user terminal, and was received by the transacting entity from the first user terminal, wherein the first user terminal is capable of conducting communications via a wireless communications network, wherein the first user terminal comprises a communications terminal, and wherein the identifier for the first user terminal comprises a unique identifier within a communication system;

determining, by the server computer, on the basis of the authorization request, the identifier for the first user terminal associated with the electronic token and an account, and wherein the account is not associated with the first user terminal;

transmitting, by the server computer, a location query for the first user terminal to a network entity in the wireless communication network, the location query comprising the determined identifier, which determines a location of the first user terminal relative to one or more wireless access nodes in the wireless communication network;

receiving, from the network entity, a result of the location query comprising the location of the first user terminal;

verifying, by the server computer, that the identifier for the first user terminal was signed with the cryptographic key; and selectively authorizing processing of the electronic token, by the server computer, in relation to the account on the basis of a result of the location query and the verifying that the identifier for the first user terminal was signed with the cryptographic key.

2. The method of claim 1, wherein the electronic token comprises one or more parameters used to generate the electronic token, and a sending user identifier associated with the second user terminal.

3. The method of claim 1, wherein the electronic token comprises a plurality of parameters including the identifier for the first user terminal, wherein the cryptographic key is a private key associated with an owner of the account that is not held by a user of the first user terminal, and wherein the electronic signature includes a signature of the plurality of parameters.

4. The method of claim 1, wherein the second user terminal is a mobile phone.

5. The method of claim 1, wherein the one or more wireless access nodes are one or more base stations in a cellular telecommunications network.

6. The method of claim 1, wherein the wireless access nodes are wireless access points.

7. The method of claim 1, wherein the transacting entity is a merchant.

8. The method of claim 1 wherein the transacting entity comprises one or more of a point of sale terminal, an automated teller machine, or a server.

9. The method of claim 1, comprising, on the basis of the selective authorization, transmitting an authorization response message to the transacting entity.

10. The method of claim 1, wherein the selective authorization of the electronic token comprises comparing the result of the location query with a known location of the transacting entity.

11. The method of claim 1, wherein the authorization request further comprises a location reported by the transacting entity, and wherein the selective authorization of the electronic token comprises comparing the result of the location query with the location reported by the transacting entity.

12. The method of claim 1, wherein the electronic token further comprises information about a sending user that operates another user terminal that provided the electronic token to the first user terminal.

13. The method of claim 1, wherein the electronic token is associated with the first user terminal as a result of the inclusion of the identifier for the first user terminal as a parameter in the electronic token.

14. The method of claim 1, further comprising, prior to receiving the authorization request, transmitting the electronic token to the first user terminal.

15. The method of claim 1, further comprising:
receiving a token generation request from another user that holds the account; and
generating the electronic token in response to receipt of the token generation request,
wherein the electronic token is transmitted to the first user terminal in response to generation of the electronic token.

16. The method of claim 1, wherein the electronic token comprises an indicator for a value of currency to be represented by the electronic token.

17. The method of claim 1, wherein the electronic token comprises one or more condition parameters for restricting processing of the electronic token.

18. The method of claim 17, wherein the selective authorization is further performed on the basis of the one or more condition parameters.

19. An apparatus for processing an electronic token, the apparatus comprising a processing system comprising a processor, and a non-transitory computer readable medium coupled to the processor, comprising code executable by the processor to cause the processing system to:
receive an authorization request in relation to processing of an electronic token comprising an identifier for a first user terminal from a transacting entity, the authorization request comprising the electronic token or an identifier for the electronic token, and an electronic signature formed by a second user terminal using a cryptographic key bound to the second user terminal, and was received by the transacting entity from the first user terminal, wherein the first user terminal is capable of conducting communications via a wireless communications network, wherein the first user terminal comprises a communications terminal, and wherein the identifier for the first user terminal comprises a unique identifier within a communication system;
determine, on the basis of the authorization request, the identifier for the first user terminal associated with the electronic token and an account, and wherein the account is not associated with the first user terminal;
transmit a location query for the first user terminal to a network entity in the wireless communication network, the location query comprising the determined identifier, which determines a location of the first user terminal relative to one or more wireless access nodes in the wireless communication network;
receive from the network entity a result of the location query comprising the location of the first user terminal;
verify that the identifier for the first user terminal was signed with the cryptographic key; and
selectively authorize processing of the electronic token in relation to the account on the basis of a result of the location query and verifying that the identifier for the first user terminal was signed with the cryptographic key.

20. A non-transitory computer-readable medium comprising computer-executable instructions which, when executed by a processor, cause a computing device to perform a method for processing an electronic token, the method comprising:
receiving an authorization request in relation to processing of an electronic token comprising an identifier for a first user terminal from a transacting entity, the authorization request comprising the electronic token or an identifier for the electronic token, and an electronic signature formed by a second user terminal using a cryptographic key bound to the second user terminal, and was received by the transacting entity from the first user terminal, wherein the first user terminal comprises a communications terminal, and wherein the identifier for the first user terminal comprises a unique identifier within a communication system;
determining, on the basis of the authorization request, the identifier for the first user terminal associated with the electronic token and an account, and wherein the account is not associated with the first user terminal;
transmitting a location query for the first user terminal to a network entity in a wireless communication network, the location query comprising the determined identifier, which determines a location of the first user terminal relative to one or more wireless access nodes in the wireless communication network;
receiving, from the network entity, a result of the location query comprising the location of the first user terminal;
verifying that the identifier for the first user terminal was signed with the cryptographic key; and
selectively authorizing processing of the electronic token in relation to the account on the basis of the result of the location query and the verifying that the identifier for the first user terminal was signed with the cryptographic key.

* * * * *